(12) United States Patent
Salsman

(10) Patent No.: US 8,749,525 B2
(45) Date of Patent: Jun. 10, 2014

(54) MULTI-BRANCH LIGHT-BASED INPUT DEVICES

(75) Inventor: Kenneth Edward Salsman, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 327 days.

(21) Appl. No.: 13/149,624

(22) Filed: May 31, 2011

(65) Prior Publication Data

US 2012/0200534 A1 Aug. 9, 2012

Related U.S. Application Data

(60) Provisional application No. 61/440,075, filed on Feb. 7, 2011.

(51) Int. Cl.
G06F 3/042 (2006.01)

(52) U.S. Cl.
USPC .......................................... 345/175; 345/173

(58) Field of Classification Search
CPC ...... G06F 3/0421; G06F 3/0412; G06F 3/042
USPC ........................................................ 345/175
See application file for complete search history.

(56) References Cited

U.S. PATENT DOCUMENTS

| 7,348,969 | B2 | 3/2008 | Robrecht et al. | |
|---|---|---|---|---|
| 2010/0079408 | A1 | 4/2010 | Leong et al. | |
| 2010/0134431 | A1* | 6/2010 | Tsai et al. | 345/173 |
| 2010/0231498 | A1* | 9/2010 | Large et al. | 345/102 |
| 2010/0231532 | A1* | 9/2010 | Nho et al. | 345/173 |
| 2010/0302196 | A1* | 12/2010 | Han et al. | 345/173 |
| 2012/0127128 | A1* | 5/2012 | Large et al. | 345/175 |

* cited by examiner

Primary Examiner — Lixi C Simpson
(74) Attorney, Agent, or Firm — Treyz Law Group; Louis R. Levenson; Michael H. Lyons

(57) ABSTRACT

A light-based input device may have multiple branches each based on a respective light-guide structure. A light source may launch light into the light-guide structures. A light sensor may detect light reflected from the light-guide structures or transmitted through the light-guide structures. The light-based input device may be used to gather user input from a user of an electronic device. The user may move an object into contact with the light-guide structures. The light sensor may monitor light intensity fluctuations from the light-guide structures to determine where the light-guide structures have been contacted by the object. Multiple wavelengths of light may be used by the light source and light sensor to reduce crosstalk between adjacent branches of the light-based input device.

14 Claims, 5 Drawing Sheets

MULTI-BRANCH LIGHT-BASED INPUT DEVICES

This application claims the benefit of provisional patent application No. 61/440,075, filed Feb. 7, 2011, which is hereby incorporated by reference herein in its entirety.

BACKGROUND

This relates generally to systems that gather user input and, more particularly, to systems with light-based input devices for gathering user input.

Electronic devices often have input-output components. For example, an electronic device may contain an output component such as a display or status indicator light for providing visual output to a user or may have a speaker or buzzer for providing audible output to a user. Input components such as electrical switches may be used to form keyboards, dedicated buttons, and other electromechanical input devices.

It may be desirable in some electronic devices to use other types of input devices. For example, it may be desirable to use light-based input devices that can accept input in ways that would be difficult or impossible using electromechanical input devices based on switches.

DETAILED DESCRIPTION

Figure 1:
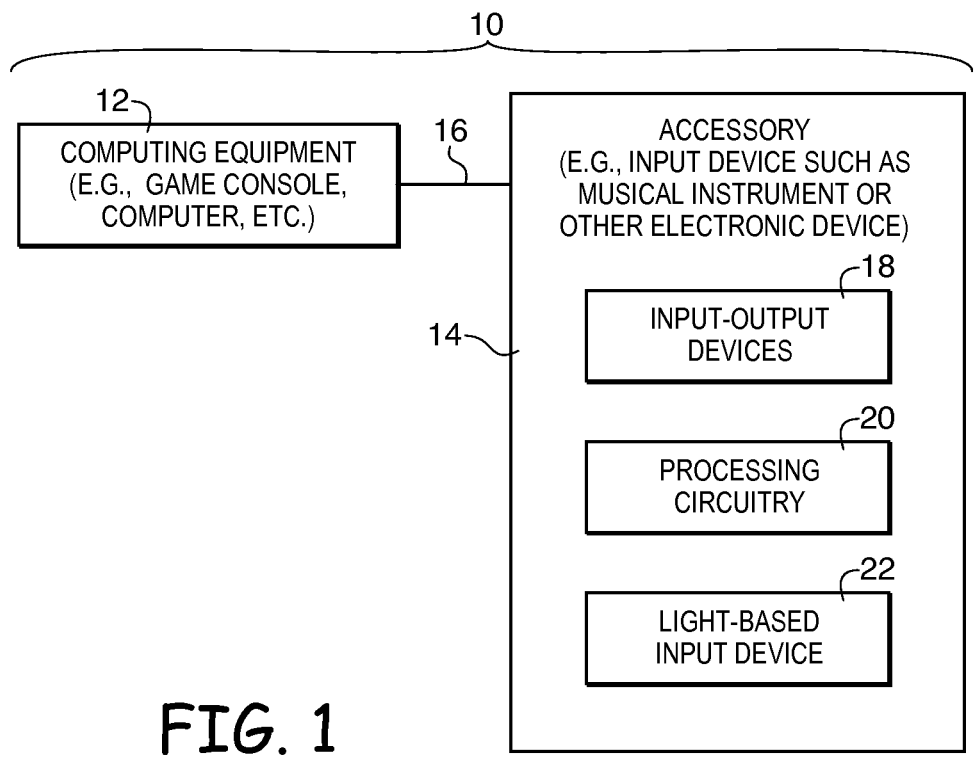
FIG. 1 is a diagram of an illustrative system of the type that may use a light-based input device in accordance with an embodiment of the present invention.

An illustrative system in which a light-based input device may be used is shown in FIG. 1. As shown in FIG. 1, system 10 may include an accessory 14 that includes a light-based input device 22. Accessory 14 may be a musical instrument such as a keyboard, a guitar, or other electronic device.

Accessory 14 may optionally be connected to external electronic equipment 12 such as a computer or game console. Accessory 14 may, for example, be coupled to equipment 12 using communications path 16. Path 16 may be a wireless path or a wired path (e.g., a Universal Serial Bus path). User input from accessory 14 may be used to control equipment 12. For example, user input from accessory 14 may allow a user to play a game on computing equipment 12 or may allow a user to supply information to other applications (e.g., music creation application, etc.).

Light-based input device 22 may contain a light source and a light sensing component. The light source may emit light that is detected by the light sensing component. A user of system 10 may supply input to light-based input device 22 using a finger or other object that produces measureable light intensity fluctuations at the light sensing component. In response, light-based input device 22 may supply corresponding output signals to processing circuitry 20. Processing circuitry 20 may include a microprocessor, application-specific integrated circuits, memory circuits and other storage, etc. Input-output devices 18 may include components such as a display, a speaker, a light-emitting diode or other status indicator, etc.

The operation of device 14 may be controlled using input that is gathered from light-based input-device 22. For example, user input from device 14 may be processed by processing circuitry 20. Processing circuitry 20 may then direct input-output devices 18 to take suitable actions in response to the user input. For example, processing circuitry 20 may use input-output devices 18 to supply output to the user that depends on the user input commands received with light-based input device and processing circuitry 20 may relay user commands that are received with light-based input device 22 to external equipment 12 via path 16.

Figure 2:
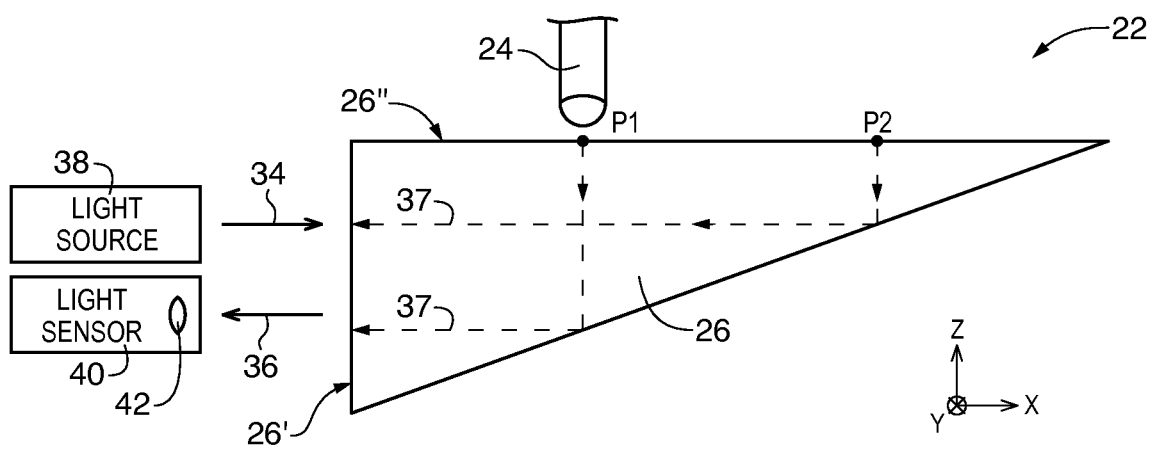
FIG. 2 is a side view of an illustrative light-based input device in accordance with an embodiment of the present invention.

An illustrative configuration that may be used for light-based input device 22 is shown in FIG. 2. As shown in FIG. 2, light-based input device 22 may have an optically transparent structure such as light-guide (waveguide) structure 26. Light-guide structure 26 may be formed from one or more optically isolated layers. In the example of FIG. 2, light-guide structure 26 has a wedge shape, but other shapes and sizes of light-guide structure may be used in light-based input device 22 if desired.

A light source such as light source 38 may supply end face 26' of light-guide structure 26 with light 34. Light source 38 may include one or more lasers, one or more light-emitting diodes, one or more lamps, or other sources of illumination. Light 34 from light source 38 may be directed into light-guide structures 26 through end face 26'. Light 34 may travel within light-guide structure 26 and, due to total internal reflection, may reflect from the interfaces between light-guide structure 26 and the surrounding environment. Light 34 may also be reflected off of a user's finger or other object 24 when object 24 contacts elongated upper surface 26" of light-guide structure 26. This causes additional reflected light 36 to exit end face 26' (or, in some configurations, causes less light 36 to exit face 26'). Intensity fluctuations in light 36 may be measured using light sensor 40. Light sensor 40 may be based on one or more photodetectors or one or more image sensor integrated circuits. Light sensor 40 may, for example, be based on an image sensor array integrated circuit that contains a two-dimensional array of image sensor pixels. Detector 40 (e.g., an image sensor array integrated circuit) may have imaging optics such as one or more lenses (shown schematically as lens 42). Using lens 42 and the image sensor array in sensor 40, sensor 40 may image the pattern of light appearing on end face 26. The data collected by sensor 40 may be analyzed to determine the location of contact of object 24 on light-guide structure 26 (e.g., the position of object 24 on upper surface 26" in the FIG. 2 example).

In the configuration of FIG. 2, object 24 has contacted upper surface 26" of light guide structure 26 in two positions: P1 and P2. As illustrated by dashed lines 37, the position at which light 36 exits end face 26' (i.e., the height of light 36 in vertical dimension z) is determined by the location along dimension x at which object 24 contacts upper surface 26" of light-guide structure 26. The pattern of exiting light 36 (e.g., the height of reflected light signals in dimension z) may therefore be used to determine the location in dimension x of the point of contact between object 24 and light-guide structure 26.

In the example of FIG. 2, light-guide structure 26 is shown as having a single layer that allows discrimination of position along a single dimension (dimension x). If desired, light-guide structure 26 may be used to determine the location in two dimensions. For example, the pattern of light exiting end face 26' of light-guide structure 26 may be analyzed to determine where object 24 contacts light-guide structure 26 in dimension y in addition to dimension x.

Figure 3:
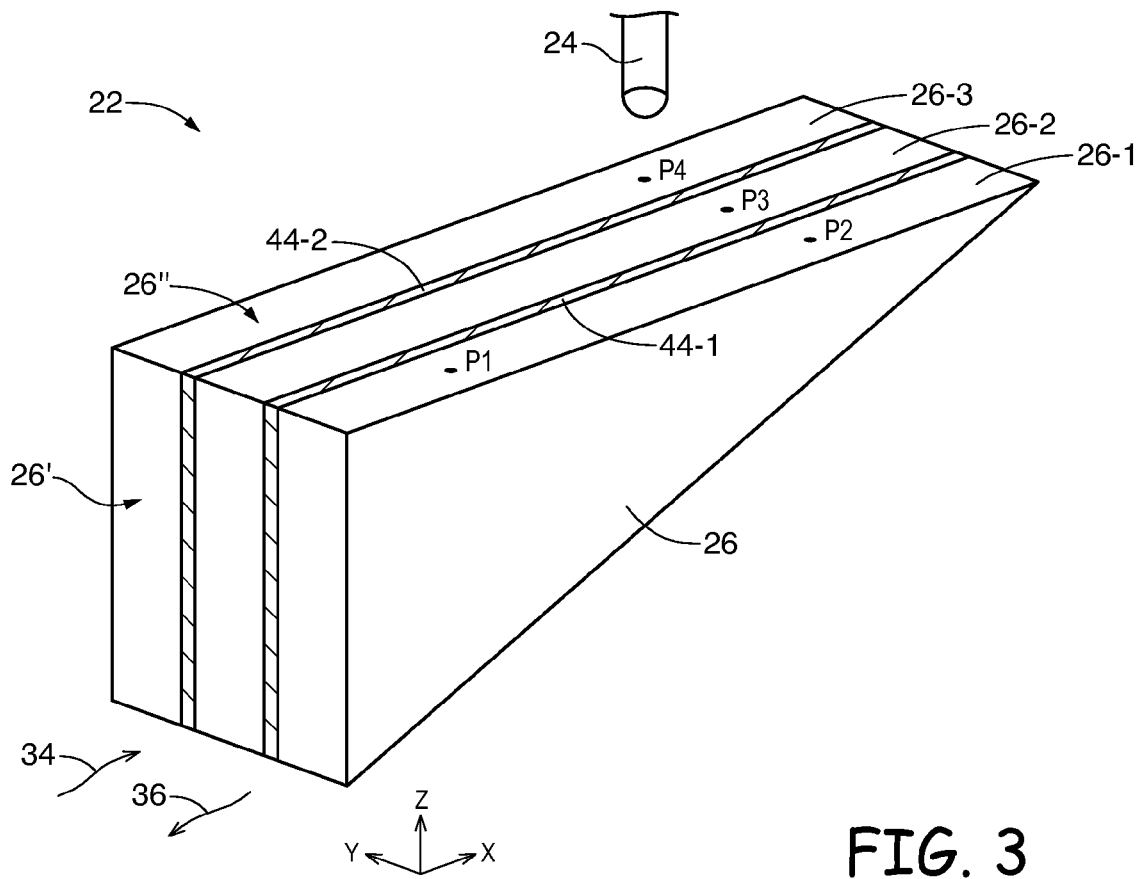
FIG. 3 is a perspective view of an illustrative multi-branch light-based input device in accordance with an embodiment of the present invention.

A perspective view of an illustrative configuration for light-guide structure 26 that allows position measurements to be made in two dimensions (x and y) is shown in FIG. 3. As shown in FIG. 3, light guide structure 26 includes three light-guide layers: light-guide structure layer 26-1, light-guide structure layer 26-2, and light-guide structure layer 26-3. Opaque layers such as layers 44-1 and 44-2 may be sandwiched together with light-guide structure layers 26-1, 26-2, and 26-3 and used to isolate light-guide layers 26-1, 26-2, and 26-3 from each other. For example, opaque layer 44-1 may prevent light from passing between layers 26-1 and 26-2 and opaque layer 44-2 may be used to prevent light from passing between layers 26-2 and 26-3. Opaque layers such as layers 44-1 and 44-2 may be formed from plastic or other suitable materials. The transparent portions of light-guide structure 26 such as layers 26-1, 26-2, and 26-3 may be formed from plastic, glass, or other transparent materials.

There are only three layers 26-1, 26-2, and 26-3 in the illustrative configuration of FIG. 3, but light-guide structure 26 may have more than three layers, fewer than three layers, five or more layers, or another suitable number of layers.

Using light-guide structures 26 of FIG. 3, light-based input device 22 may discriminate contact positions in dimensions x and y. Consider, for example, contact positions such as positions P1, P2, P3, and P4. Two of these positions (P1 and P2) are located on layer 26-1. Light intensity measurements and/or measurements of the position of exiting light 36 in dimension z may be used to determine the position of contact along dimension x, thereby discriminating between contact at position P1 and contact at position P2. Positions P2, P3, and P4 are located at identical locations along the length of light-guide structure 26 in dimension x. Positions P2, P3, and P4 are, however, each associated with different locations in dimension y and different corresponding layers of light-guide structure 26. Measurements in dimension y on the location of light that is exiting structure 26 may be used to discriminate between positions P2, P3, and P4. The presence of opaque layers 44-1 and 44-2 may help prevent spurious signals from one light-guide layer from interfering with signals from an adjacent light-guide layer.

Figure 4:
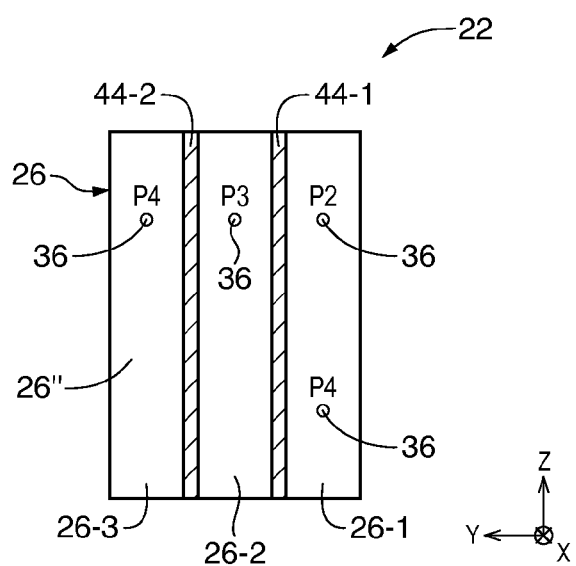
FIG. 4 is an end view of an illustrative multi-branch light-based input device of the type shown in FIG. 3 showing where reflected light signals may appear when the upper surface of the input device is contacted by a user's finger or other object in accordance with an embodiment of the present invention.

A diagram of end face 26' of light-guide structures 26 showing the location of reflected light 36 in response to contact between object 24 and upper surface 26" when surface 26" is contacted in locations P1, P2, P3, and P4 is shown in FIG. 4.

As shown in FIGS. 2 and 4, different points of contact between object 24 and upper surface 26" may produce identifiable patterns of light 36. For example, light 36 that is reflected when object 24 contacts point P1 may be brighter and located at a lower height (z-dimension) than light 36 that is reflected when object 24 contacts points P2, P3, and P4. Light sensor 40 may use the brightness information and/or height information to determine the location in dimension x of the point of contact. The location of light 36 that is reflected when object 24 contacts points P2, P3, and P4 can be measured in dimension y to discriminate between positions P2, P3, and P4. Light 36 that is associated with position P2 exits layer 26-1, light 36 that is associated with position P3 exits layer 26-2, and light that is associated with position P4 exits layer 26-3. By identifying which layer of light-guide structure 26 is associated with exiting light 36, sensor 40 can discriminate between contact events in positions P2, P3, and P4. The inclusion of opaque layers 44-1 and 44-2 may help prevent stray light from passing between light-guide layers 26-1, 26-2, and 26-3 and may therefore help ensure that image sensor 40 can discriminate between contact points located on each of these layers.

Figure 5:
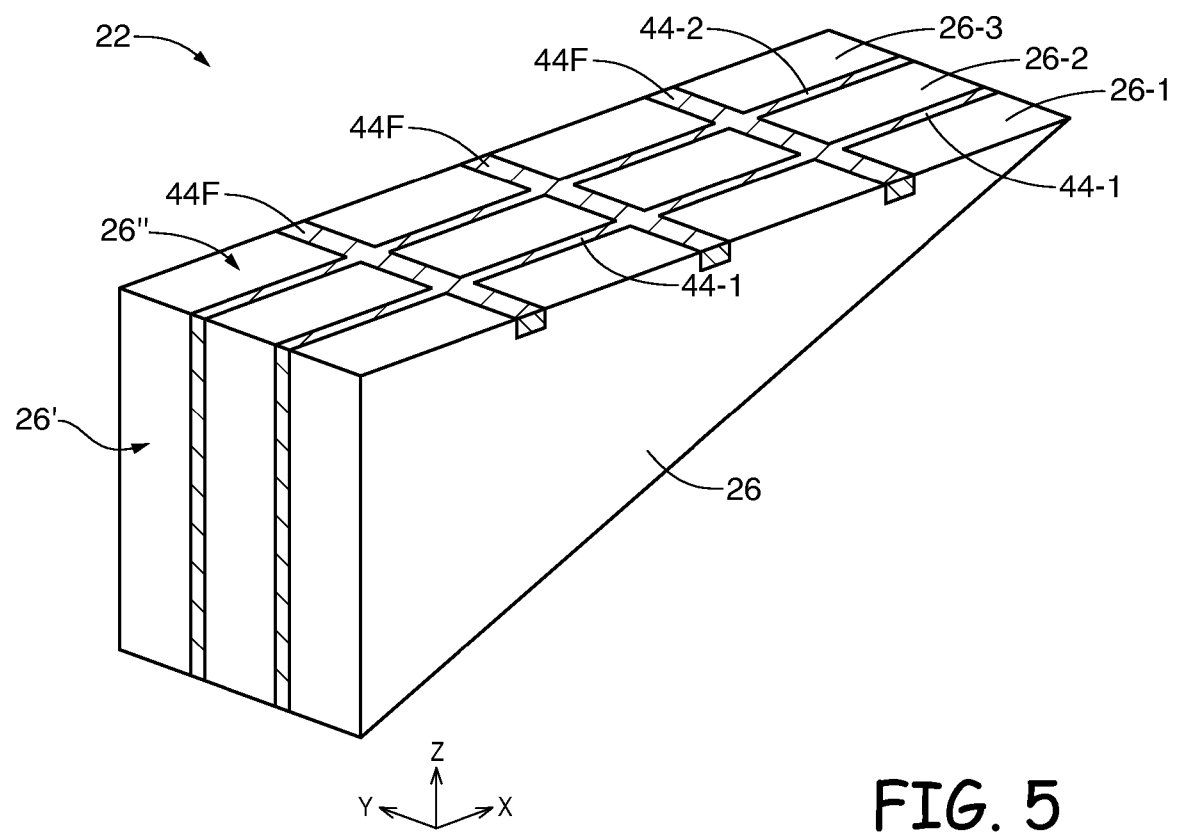
FIG. 5 is a perspective view of an illustrative multi-branch light-based input device having separator structures that divide each branch of the device into multiple segments along its length in accordance with an embodiment of the present invention.

If desired, layers 26-1, 26-2, and 26-3 may be divided into individual segments along the elongated length of surface 26". As shown in FIG. 5, for example, separator structures 44F may be interposed between respective portions of layers 26-1, 26-2, and 26-3 to divide each layer lengthwise into four individual segments (in the present example). Separators 44F may, as an example, be formed from opaque structures such as portions of separator layers 44-1 and 44-2. Separators 44F preferably to not penetrate through the entire thickness (in dimension z) of structures 26-1, 26-2, and 26-3 to ensure that light is not blocked entering and leaving light-guide structure 26. The presence of separators 44F may help create surface regions on surface 26" of light-guide structure 26 that are insensitive to contact by object 24 (as with frets on a guitar fretboard). In an alternative embodiment, separators 44F may be formed from transparent structures that allow light to enter and leave light-guide structure 26. In the example in which separators 44F are formed from transparent structures, surface 26" may be coated with an optical blocking agent (e.g., surface 26" may be optically blacked such that light may only enter and leave light-guide structure 26 through separators 44F). Any suitable number of separators may be provided along the length (x-dimension) of light-guide structure 26. In the example of FIG. 5, three separators 44F have been used, but more than three or fewer than three separators may be provided if desired.

In configurations of the type shown in FIGS. 3, 4, and 5, layers 26-1, 26-2, and 26-3 form three separate branches of light-based input device 22. These three light-guide branches may serve as virtual strings in a virtual stringed instrument or may be used to acquire user input in other systems. The examples of FIGS. 3, 4, and 5 involve the use of wedge-shaped light-guide structures, but other types of light-guiding branches may be used in light-based input device 22 if desired. In general, light-based input device 22 may have multiple position-sensing branches that are formed from wedge-shaped light-guide layers, flexible light-guide rods or other flexible elongated light-guide members, light-guide structures with recesses such as notches or other depressions, or other suitable transparent structures capable of carrying light and capable of being influenced by contact with external object 24.

FIGS. 6, 7, 8, and 9 are side views of illustrative structures that may be used in forming light-based input device light guide branches 22B.

Figure 6:
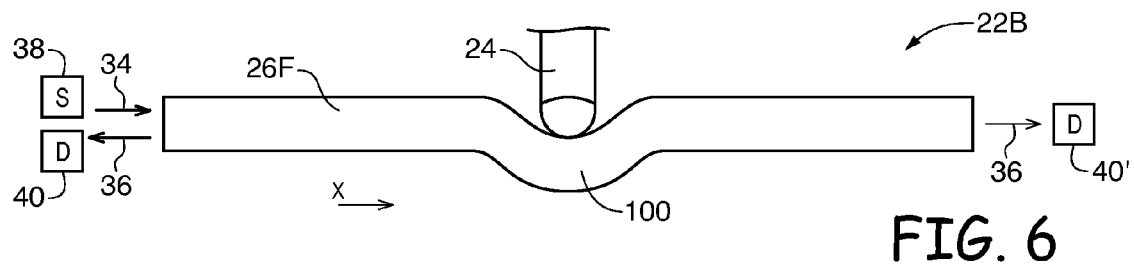
FIG. 6 is a side view of an illustrative branch in a light-based input device having an elongated flexible light-guide structure such as a bendable light-pipe structure that may be locally bent along its length by a user in accordance with an embodiment of the present invention.

In the illustrative configuration of FIG. 6, light-based input device branch 22B has been formed using a flexible elongated light-guide structure 26F. Flexible elongated light-guide structure 26F may be formed from a flexible plastic rod or other flexible elongated light-guiding member that can be deformed upon contact with object 24. Light source 38 may supply light 34 to the left-hand end of structure 26F. One or more light sensors such as detector 40 and/or detector 40' (e.g., photodetectors) may be used to measure reflected light 36 and/or transmitted light 36'. When object 24 contacts structure 26F, structure 26F locally deforms (e.g., by forming bend 100). The presence of bend 100 affects the light-transmitting and light-reflecting properties of structure 26. As a result, the amount of light that is transmitted through structure 26F and reflected from structure 26F is altered as a function of the position of contact with object 26. Relatively more light is reflected (and more light may be absorbed), when the contact position (bend position) is closer to light source 38 (i.e., at relatively smaller values of dimension x). By measuring the amount of reflected and/or transmitted light, the value of x for the contact point may be measured.

Figure 7:
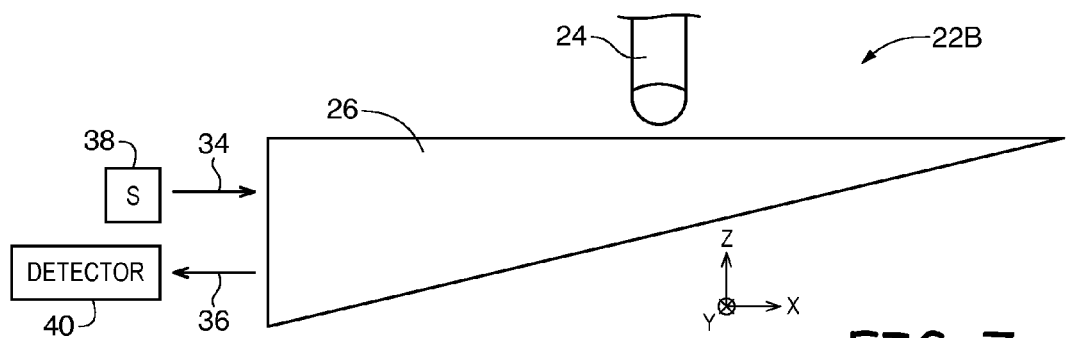
FIG. 7 is a side view of an illustrative branch in a light-based input device having a wedge-shaped light-guide structure and a light detector that determines the location at which contact is made with the light-guide structure using light intensity measurements in accordance with an embodiment of the present invention.

In the illustrative configuration of FIG. 7, light-based input device branch 22B has been formed using a wedge-shaped light-guide structure 26. Light 34 may be launched into light-guide structure 26 using light source 38. Reflected light 36 may vary in intensity based on the position of contact between external object 24 and upper surface 26' of light-guide structure 26. Light detector 40 (e.g., a photodetector) may measure the intensity of the reflected light to determine the contact position (i.e., to determine the value of x for the contact point).

Figure 8:
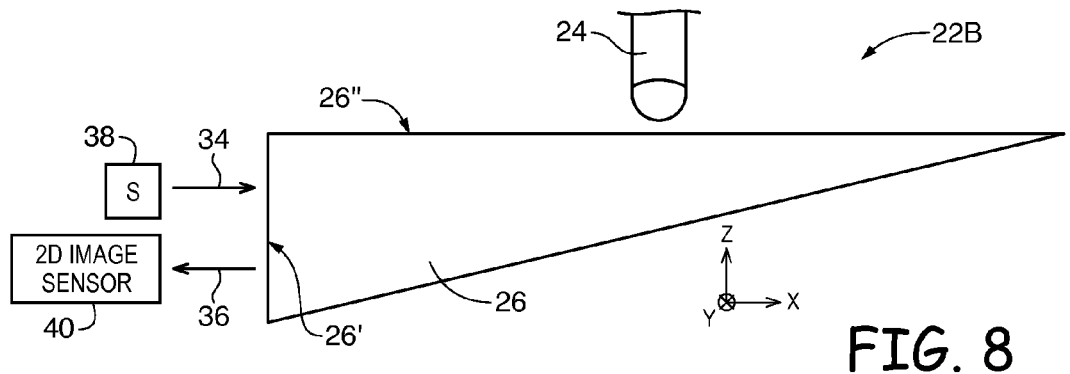
FIG. 8 is a perspective view of an illustrative branch in a light-based input device having a wedge-shaped light-guide structure and an image sensor array integrated circuit or other light sensor that monitors patterns of light exiting an end face of the wedge-shaped light-guide structure to determine the location at which contact is made with the light-guide structure in accordance with an embodiment of the present invention.

In the illustrative configuration of FIG. 8, light-based input device branch 22B has been formed using a wedge-shaped light-guide structure that is being monitored by an image sensor array integrated circuit 40. Light source 38 launches light 34 into end face 26' of wedge-shaped light-guide structure 26. Image sensor array integrated circuit 40 may have a two-dimensional image sensor array that captures images of end face 26'. When object 24 contacts upper surface 26" of light-guide structure 26, the pattern of light exiting end face 26' changes, as described in connection with FIG. 2. This allows image sensor array integrated circuit 40 to determine the location of contact of structure 26 with respect to longitudinal dimension x.

Figure 9:
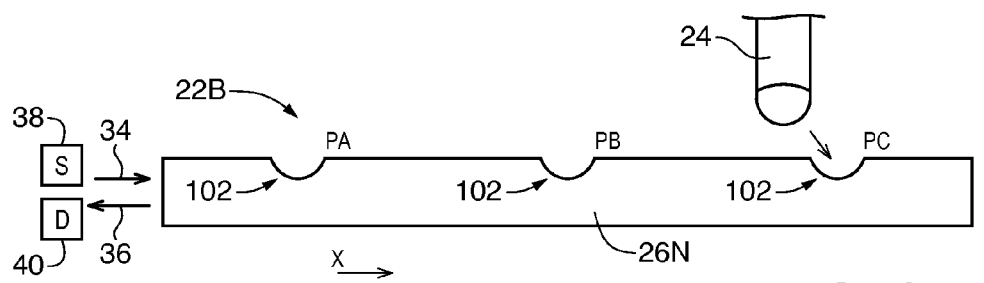
FIG. 9 is a side view of an illustrative branch in a light-based input device in which a light-guide structure has been provided with recessed portions that can be contacted by an external object to produce measurable light intensity fluctuations at an associated light detector in accordance with an embodiment of the present invention.

In the illustrative configuration of FIG. 9, light-based input device branch 22B has been formed using an elongated light-guide structure with recessed portions such as notches 102. Object 24 (e.g., a user's finger) may be placed in a recess 102 at position PA, in a recess 102 at position PB, or in a recess 102 at position PC (as shown in FIG. 9). Light source 38 may launch light 34 into elongated light-guide structure 26N. Light sensor 40 (e.g., a photodetector) may measure corresponding reflected light 36. When object 24 is present, more light (or in some configurations, less light) is reflected back towards light sensor 40 than when object 24 is not present. The amount of increased light reflection is greatest when object 24 is placed in the recess at position PA, is less when object 24 is placed in the recess at position PB, and is least when placed in the recess at position PC. Detector 40 can evaluate the amount of reflected light and can determine from this measurement whether object 24 is located at position PA, PB, or PC. If desired, a detector at the far end of light-guide structure 26N may be used to measure the amount of light that is transmitted through light-guide structure 26N. The presence of object 24 at other locations along the surface of elongated light-guide structure 26N (i.e., at non-recessed portions) will generally have less influence on reflected light intensity than the presence of object 24 in one of recesses 102.

Branches such as light-guide branches 22B of FIGS. 6, 7, 8, and 9 are merely illustrative. Light-based input device 22 may have light-guide branches that are formed from other suitable types of contact-sensitive light-guide structures if desired. Moreover, light-based input device may have any suitable number of branches (e.g., one, two, three, four, five, six, more than six, etc.).

Figure 10:
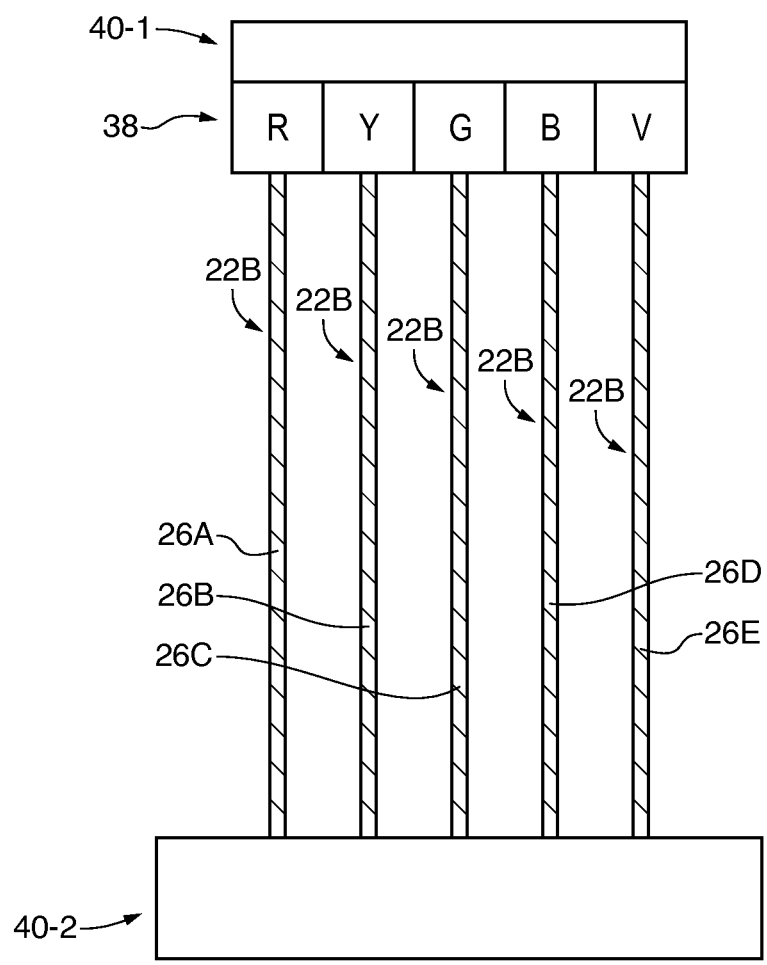
FIG. 10 is a top view of an illustrative light-based input device having five branches in accordance with an embodiment of the present invention.

FIG. 10 is a top view of an illustrative light-based input device 22 having five branches 22B. Each branch 22B may be formed from a structure of the type shown in FIG. 6, 7, 8, or 9 and/or other suitable light-guide structures. To prevent crosstalk between adjacent branches, it may be desirable to use different wavelengths of light for different branches 22B. For example, light-source 38 may contain colored light source components such as lasers of different wavelengths, light-emitting diodes that emit different colors of light, lamps or other light sources that have associated colored filters, etc. Light sensors such as illustrative reflected light sensor 40-1 and/or illustrative transmitted light sensor 40-2 may be implemented using light-sensing components with corresponding frequency-dependent responses.

As shown in FIG. 10, light source 38 may, as an example, have a red light source R, a yellow light source Y, a green light source G, a blue light source B, and a violet light source V. Other colors of light (e.g., wavelengths in the infrared and/or visible portions of the spectrum) may be used if desired. The use of red, yellow, green, blue, and violet in the present example is merely illustrative. Red light source R launches light into light-guide structure 26A, yellow light source Y launches light into light-guide structure 26B, green light source G launches light into light-guide structure 26C, blue light source B launches light into light-guide structure 26D, and violet light source V launches light into light-guide structure 26E. Detector 40-1 may be used to gather corresponding reflected light signals from the light-guide structures and/or detector 40-2 may be used to gather corresponding transmitted light signals from the light guide structures. Detectors 40-1 and 40-2 may be provided with multiple wavelength-specific photosensitive elements such as photodetectors with notch filters, colored filters, or other structures that ensure that each photosensitive element primarily or exclusively responds to a particular one of the wavelengths being emitted by light-source 38.

Detectors 40-1 and 40-2 may, for example, include a red-sensitive light detector that detects only red light from red light source R, a yellow-sensitive light detector that detects only yellow light from yellow light source Y, a green-sensitive light detector that detects only green light from green light source G, a blue-sensitive light detector that detects only blue light from blue light source B, and a violet-sensitive light detector that detects only violet light from violet light source V. Because each light sensor in this type of arrangement is sensitive to only a single wavelength of light, stray light from light sources in adjacent branches 22B of light-based input device 22 (e.g., stray light having different wavelengths of light) will not produce undesirable crosstalk.

The foregoing is merely illustrative of the principles of this invention which can be practiced in other embodiments.

What is claimed is:

1. A multi-branch light-based input device for gathering user input in an electronic device, comprising:
   a plurality of light-guide structures each forming a respective branch in the multi-branch light-based input device;
   a light source that supplies light to the light-guide structures wherein each light-guide structure is configured to produce light intensity fluctuations in the light in response to contact by an object positioned by a user of the electronic device;
   a light sensor that determines where the object has contacted the light-guide structures by measuring the light intensity fluctuations, wherein the light-guide structure in each branch comprises a wedge-shaped light-guide structure; and
   opaque layers interposed between respective pairs of the wedge-shaped light-guide structures.

2. The multi-branch light-based input device defined in claim 1 wherein the light sensor comprises an image sensor array integrated circuit having a two-dimensional array of image pixels.

3. The multi-branch light-based input device defined in claim 2 wherein the light guide structures each have an elongated surface that is divided into segments along its length by opaque separator structures.

4. The multi-branch light-based input device defined in claim 1 wherein the light sensor comprises a plurality of photodetectors and wherein each photodetector is configured to measure light intensity fluctuations associated with a respective one of the light-guide structures.

5. The multi-branch light-based input device defined in claim 4 wherein the photodetectors are configured to measure light transmitted through the light-guide structures.

6. The multi-branch light-based input device defined in claim 4 wherein the photodetectors are configured to measure light reflected from the light-guide structures.

7. The multi-branch light-based input device defined in claim 1 wherein the light-guide structures comprise flexible elongated light-guiding members that are configured to bend when contacted by the object.

8. The multi-branch light-based input device defined in claim 7 wherein the light sensor comprises a plurality of photodetectors each of which measures light intensity fluctuations associated with a respective one of the flexible elongated light-guiding members.

9. The multi-branch light-based input device defined in claim 1 wherein the light-guide structures comprise elongated light-guide structures with surfaces having recesses that are configured to receive the object.

10. The multi-branch light-based input device defined in claim 9 wherein the light sensor comprises a plurality of photodetectors each of which measures light intensity fluctuations associated with a respective one of the elongated light-guide structures when contacted by the object in one of the recesses.

11. The multi-branch light-based input device defined in claim 1 wherein the light source comprises a plurality of light sources each of which is configured to launch light at a different wavelength into a different respective one of the light-guide structures.

12. The multi-branch light-based input device defined in claim 11 wherein the light sensor comprises a plurality of photodetectors each of which is configured to respond to only a single one of the different wavelengths.

13. An input device in an electronic device for gathering user input from a user of the electronic device when the user places an object into contact with the input device, comprising:
   a plurality of light-guide structures;
   a light source that supplies light to the light-guide structures, and
   an image sensor array integrated circuit having a two-dimensional image sensor array that senses the light to determine where the object has been placed into contact with the light-guide structures, wherein the plurality of light-guide structures comprise a plurality of transparent light-guide structure layers, wherein the transparent light-guide structure layers have elongated surfaces and wherein the input device further comprises opaque separator structures that divide each of the transparent light-guide structure layers into segments along their elongated surfaces.

14. The input device defined in claim 13 wherein the plurality of transparent light-guide structure layers are interposed with layers of opaque material.

* * * * *